M. H. TREADWELL & C. P. ASTROM.
THREADING DIE.
APPLICATION FILED AUG. 1, 1908.
944,584.
Patented Dec. 28, 1909.
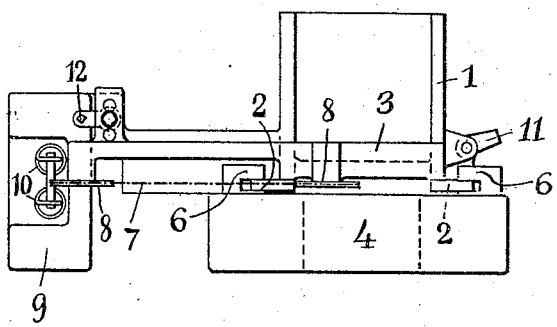
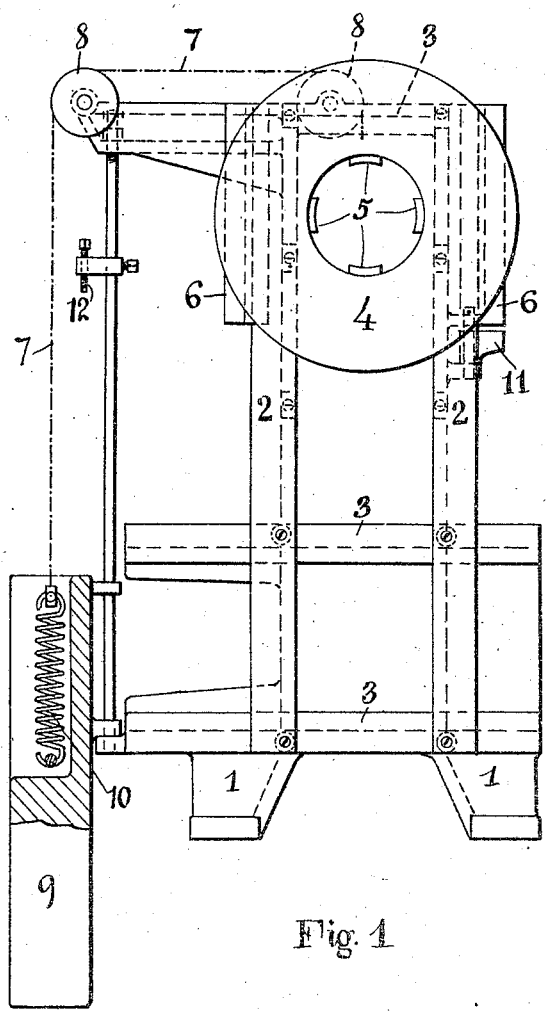
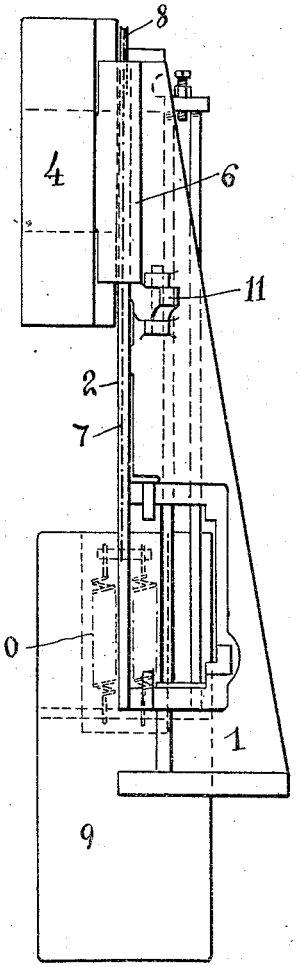
Witnesses
Geo. Hoffman.
Geo. N. Kerr.
Inventors
M. H. Treadwell +
C. P. Astrom
By their Attorneys
Edwards, Sager & Wooster.

UNITED STATES PATENT OFFICE.

MUNSON H. TREADWELL, OF NEW YORK, N. Y., AND CARL P. ASTROM, OF ORANGE, NEW JERSEY, ASSIGNORS TO STOEVER FOUNDRY & MANUFACTURING COMPANY, OF LEBANON, PENNSYLVANIA, A CORPORATION OF PENNSYLVANIA.

THREADING-DIE.

944,584.	Specification of Letters Patent.	Patented Dec. 28, 1909.

Application filed August 1, 1908. Serial No. 446,365.

*To all whom it may concern:*

Be it known that we, MUNSON H. TREADWELL and CARL P. ASTROM, citizens of the United States, residing at New York, in the county of New York and State of New York, and Orange, in the county of Essex and State of New Jersey, respectively, have invented certain new and useful Improvements in Threading-Dies, of which the following is a full, clear, and exact specification.

This invention relates to threading dies, and has particular reference to improvements whereby a head carrying threading dies or some other tool may be mounted in such manner as to have a certain amount of universal movement relatively to its support. In pipe threading machines, for instance, it is desirable that the die head have a certain amount of universal movement in order that it may center itself relatively to the axis of rotation of the work, and this invention has for its object to mount a die-head in such manner as to permit of its being centered by the work, and also to permit the die head to be moved bodily away from its operative position in order to allow some other operation to be performed.

In the embodiment of the invention herein shown, a die head adapted to carry the usual threading dies is mounted to slide bodily to and away from its operative position, and when in operative position is adapted to be freely movable to a limited extent transversely of its bodily movement in accordance with the center of the work. This result is attained by providing a space between the guides and the die head body, in which the latter can move to the extent required, and also, by reason of the engagement of the dies and the work, turn axially to give the necessary resistance to cause the dies to cut the thread. Preferably, the die head is mounted so as to be slid vertically out of the way of the other tools, and in combination therewith are provided balancing and latching means whereby the head can be held up out of operative position when desired.

In the accompanying drawings, Figure 1 is a front view showing the die head in elevated position, Fig. 2 is a side view, and Fig. 3 is a top plan view.

1, 1 represent a base adapted to be mounted on a threading machine in front of the chuck, and carrying uprights or guides 2 connected by cross pieces 3.

4 represents a die head, comprising a die block adapted to carry threading dies 5. Secured to the back of the die head are a pair of L-shaped retaining guide blocks 6, bearing closely on the faces of the guides 2, but spaced therefrom at the sides so that the die head can move laterally or diagonally therein to a limited extent to compensate for eccentricity of the work. Attached to the die head by a cable 7 passing over pulleys 8 is a weight 9, preferably through a spring 10. The weight 9 is proportioned to approximately balance the weight of the die head, so that the latter can move freely vertically in accordance with the eccentricity of the work being threaded. It will thus be seen that this construction provides what may be termed a "floating" die head, which will be free to move in any direction to accommodate itself to the irregularity of the work, and relieving the work of sustaining the die head. This universal movement is thus obtained by a construction which is much more simple and cheap to build than any which have heretofore been proposed. Preferably the mass of the weight will be very slightly less than that of the die head, and to hold the die head elevated, a latch 11, mounted on the guide 2 will be provided to pass under the die head in its highest position. An adjustable stop 12 is provided to engage the weight at its upper position, but it will be seen that this will not interfere with the universal movement of the die head, since the die head can pull against the spring 10, without moving the weight. The stop 12 thus serves to indicate the normal operative position of the die head, without preventing the latter from having a free universal movement in all directions. While the dies are cutting, it will be seen that the die head will tilt or turn somewhat, until further rotation is prevented by the engagement of the die head retaining guide blocks and the stationary guides 2 due to the cutting strain.

It will be understood that various forms of cutting dies may be used in the die head as may be desired, either expanding or not, and also that the specific details of construction herein may be varied, without departing from the scope of the invention.

Having thus described our invention, we declare that what we claim as new and desire to secure by Letters Patent, is,—

1. A die mechanism comprising a die head support, a die carrying head mounted to move vertically therein, means balancing the weight of the die head, a spring coöperating with said die head and said balancing means and side guides spaced apart from the sides of the die head to allow limited lateral movement of the die head.

2. A floating die mechanism comprising a die head, a counterbalance weight flexibly connected with the die head, and side guides preventing longitudinal movement of the die head but spaced from the die head at the sides to permit limited transverse movement and rotation of the die head between the guides.

3. A die mechanism comprising a die carrying head, guides therefor permitting free reciprocatory movement but preventing longitudinal movement of the die head, and spaced from opposite sides of the die head to permit free transverse movement to a limited extent between the guides, and a counterbalance for the die head.

4. The combination with a die head mounted to move universally on its support, of guides permitting the die head to be slid vertically away from operative position, and a counterbalance attached to the die head, and holding the die head in either position.

5. A die mechanism comprising a die head, guides for said die head to prevent longitudinal movement of the same and spaced to permit free transverse and rotational movement to a limited extent when in operative position, and means substantially balancing the weight of said die head to permit unrestrained movement of the die head in response to eccentricity of the work.

In testimony whereof we affix our signatures, in presence of two witnesses.

MUNSON H. TREADWELL.
CARL P. ASTROM.

Witnesses:
J. S. WOOSTER,
GEO. A. HOFFMAN.